United States Patent [19]

Alonso

[11] Patent Number: 4,756,083

[45] Date of Patent: Jul. 12, 1988

[54] SLICING AND STORING DEVICE

[76] Inventor: Modesto C. Alonso, 25 Manor Dr.-12N, Newark, N.J. 07106

[21] Appl. No.: 51,389

[22] Filed: May 19, 1987

[51] Int. Cl.[4] .......... A21C 5/00

[52] U.S. Cl. .......... 30/115; 30/124; 30/278; 83/467 A

[58] Field of Search .......... 30/115, 116, 124, 278; 221/30, 31; 222/80; 83/648, 467 R, 467 A

[56] References Cited

U.S. PATENT DOCUMENTS

| | | | |
|---|---|---|---|
| 924,642 | 6/1909 | Curtin | 30/115 X |
| 1,679,004 | 7/1928 | Pinkel et al. | 30/116 X |
| 2,580,864 | 12/1949 | Upright . | |
| 2,634,692 | 10/1953 | Sherbondy | 30/115 X |
| 2,737,721 | 5/1953 | Hart . | |
| 2,813,336 | 11/1956 | Ackerman . | |
| 4,122,737 | 10/1978 | Denson | 83/467 A X |
| 4,513,501 | 4/1985 | Lee | 30/115 |
| 4,697,488 | 10/1987 | Cole | 30/116 X |

*Primary Examiner*—Douglas D. Watts

*Attorney, Agent, or Firm*—Karen M. Gerken; Martin P. Hoffman; Mitchell B. Wasson

[57] ABSTRACT

A combination slicing and storing device for food products in block form wherein the food product is caused to descend by gravity within a tubular member mounted on a base such that a portion of the food product projects through an opening in the base and is supported on a recessed food support provided on a slice holder plate. The slice holder plate is operatively associated with a trigger member mounted on the base, being adapted for sliding movement with respect to the base upon manual actuation of the trigger member by a user of the device. Actuation of the trigger member causes a cutting member on the slice holder plate to be drawn through the projecting portion of food so as to create a slice of food product of uniform thickness. The slice is allowed to fall away from the device and onto a serving dish or plate by virtue of the fact that the food support has moved out of position beneath the food product. Spring means is provided for automatically returning the trigger and the slice holder plate to their normal position when the trigger member is released by the user.

11 Claims, 2 Drawing Sheets

SLICING AND STORING DEVICE

BACKGROUND OF THE INVENTION

1. Field of the Invention

The invention generally pertains to a device for slicing and storing a bar or block of butter, margarine, or like foodstuff which may assume a generally rectangular or loaf configuration. More particularly, the invention relates to a device adapted to receive a bar of butter or like block of food in a manner which is particularly suitable for protecting the butter or other food from contaminants while storing the food in a refrigerator or otherwise. Additionally, the subject invention provides a lightweight, compact, portable device which is capable of being hand-held for delivering butter or food slices of uniform thickness by the user simply manually actuating a trigger member on the device. Actuation of the trigger member results simultaneously in actuation of a slicing means which cuts a slice of foodstuff of predetermined thickness. The cut slice is allowed to fall by gravity away from the device and the trigger member returns automatically to its original position.

Actuation of the trigger member is simple and effortless. Moreover, operation of the trigger member is specifically adapted to not require any actual contact between the hands of the user and the foodstuff, as is required when utilizing a knife or other conventional cutting devices, thereby insuring purity of the resulting butter or food slice. The fact that the food slice produced by means of the device is intended to fall by gravity further guarantees non-contamination of the food product by allowing the slice to be guided directly into a serving dish or the plate of the user without coming into contact with the user's hands. Moreover, the provision for direct delivery of the sliced food product makes the subject device highly convenient for obtaining immediately a precise slice of food.

The instant invention is further characterized by the fact that each of the food slices which are produced are of a uniform thickness. The invention thereby provides a successful solution to the problems of inaccuracy and non-uniformity associated with conventional cutting means, such as knives. Indeed, the foodstuff contained in the subject device is precisely and automatically positioned therein for production and delivery of a slice of a specific thickness without the need for intervention by the user. The device thus avoids the problems of uncertainty found in cutting devices which require the user to advance the foodstuff the proper extent therein in order to obtain a slice of food of a desired thickness.

The foregoing attributes are realized by providing a device as disclosed herein, which requires only a few, easily cleanable parts, which is safe and easy to utilize, and which combines slicing and storing capabilities in a single apparatus.

2. Description of the Prior Art

It is known in the prior art to provide cutting and storing means for foodstuff in bar or block form. For example, U.S. Pat. No. 2,580,864, issued on Jan. 1, 1952 to Upright, discloses a tabletop supported dispenser for butter, cheese and similar foods. The dispenser comprises a container for receiving the food and a hinged door having a handle and downwardly extending knifing blade adjacent thereto. The food to be cut by depression of the handle is advanced within the dispenser by means of a nut and threaded member.

U.S. Pat. No. 2,737,721, issued on Mar. 13, 1956 to Hart, is directed to a hand-held slicing and storing device for loaf food products disposed in a horizontal position and being advanced within the device by a plunger. A spring-loaded, squeeze grip levered mechanism provided with a cutting element is adapted to be swung downwardly over the device to sever the advanced food product.

U.S. Pat. No. 2,813,336, issued on Nov. 19, 1956 to Ackerman, shows a cutter, server and storer device for food having a cutting assembly including rod elements which are disposed perpendicular to the container and which assist in the movement of a cutter blade. The device is adapted to be hand-held, and the food to be cut is advanced outwardly by a user manually pushing forward a follower member.

U.S. Pat. No. 4,513,501, issued on Apr. 30, 1985 to Lee, discloses a storing and cutting device having a frame-held taut cord or wire which is actuated by a levered arm. Food is advanced within the container by pushing means.

SUMMARY OF THE INVENTION

The invention is directed to a combination slicing and storing device for food products and, in particular, for food products in bar or block form, such as butter, margarine or the like.

The slicing and storing device comprises a base which is supported by first and second side walls and a pair of end walls. The side and end walls are adapted to rest upon a support surface so as to support the base in raised relation thereto. The base is provided with an opening, from which upwardly extends a tubular member. The tubular member is adapted to receive the vertically oriented food product by a user inserting the food product into an opening provided in the tubular member.

The base is further provided with a stationary handle member located on the base generally opposite to the tubular member. A trigger member is provided on the base and is adapted to be manually drawn toward the handle member by a user when operating the device.

The trigger member is operatively secured to a slice holder plate which underlies the base. A slice holder slot is formed in said slice holder plate and a recessed food support member extends across the slice holder slot. In the normal position of the slicing and storing device, the slice holder slot is generally aligned with the opening in the base so that the food product, which descends within the tubular member, is allowed to project through the opening and the aligned slice holder slot and is supported by the food support member.

A stop member projects downwardly from the base through the slice holder slot and, in the normal position of the slicing and storing device, is located along one side of the projecting portion of food product. A cutting member is provided on the slice holder plate, being located directly opposite to the stop member along the opposite side of the projecting portion of food product. Spring means extend between the slice holder plate and the base for purposes of retaining the slice holder plate in its normal position.

The slice holder plate is adapted for movement with respect to the base when a user manually grasps the trigger member and handle member and draws the trigger member toward the handle member. The slice holder plate is thus simultaneously drawn toward the handle member such that the cutting member is drawn through the projecting portion of food product so as to produce a slice of food product of uniform thickness, as measured by the vertical distance between the cutting member and the food support surface. Movement of the slice holder plate in relation to the base is restricted to the extent that movement of the plate is limited to the point at which the cutting member contacts the stop member.

When the trigger member is thus drawn toward the handle member, and as the slice holder plate moves therewith, the slice holder slot and, hence, the food support member, is moved into a position wherein it is no longer in alignment with the opening in the base. Therefore, the slice which is produced by the cutting member being drawn through the food product is unsupported and is free to fall away from the device and directly into a serving dish, plate, or the like over which the device has been positioned by the user.

When the trigger member has been drawn fully toward the handle member, as limited by the cutting member contacting the stop member, an unslotted or solid portion of the slice holder plate moves into position beneath the opening in the base. The food product contained in the tubular member is thus prevented from descending through the opening until such time as the slice holder plate has been returned to its normal position. The spring means, which is placed under tension when the trigger member is drawn toward the handle member, is adapted to automatically return the trigger member and the slice holder plate to the normal position when the trigger is released by the user.

DESCRIPTION OF THE PREFERRED EMBODIMENT

Figure 1:
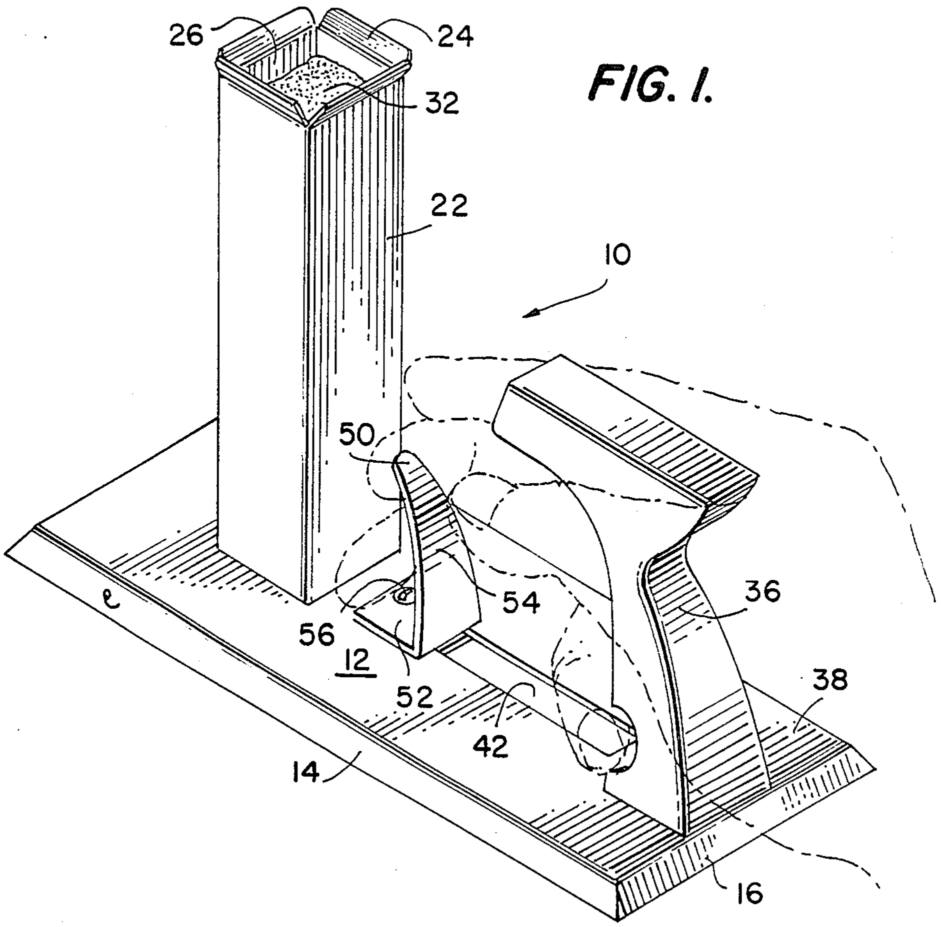
FIG. 1 is a perspective view of the slicing and storing device with the hand of a user grasping the trigger member being shown in phantom.
Figure 2:
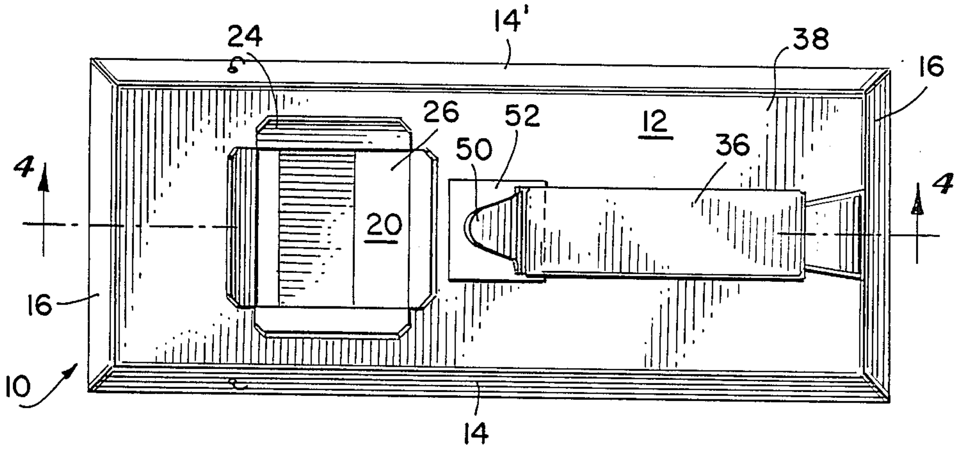
FIG. 2 is a top plan view of the slicing and storing device.
Figure 3:
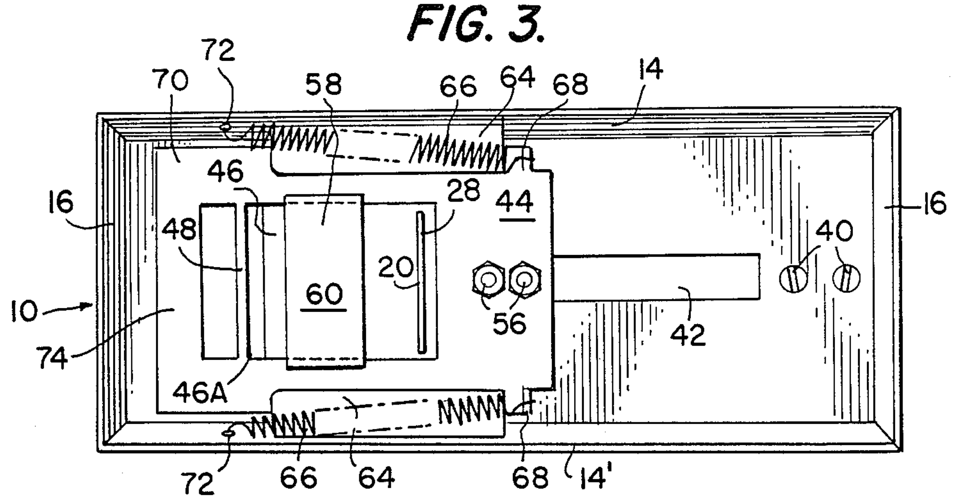
FIG. 3 is a bottom plan view of the slicing and storing device.
Figure 4:
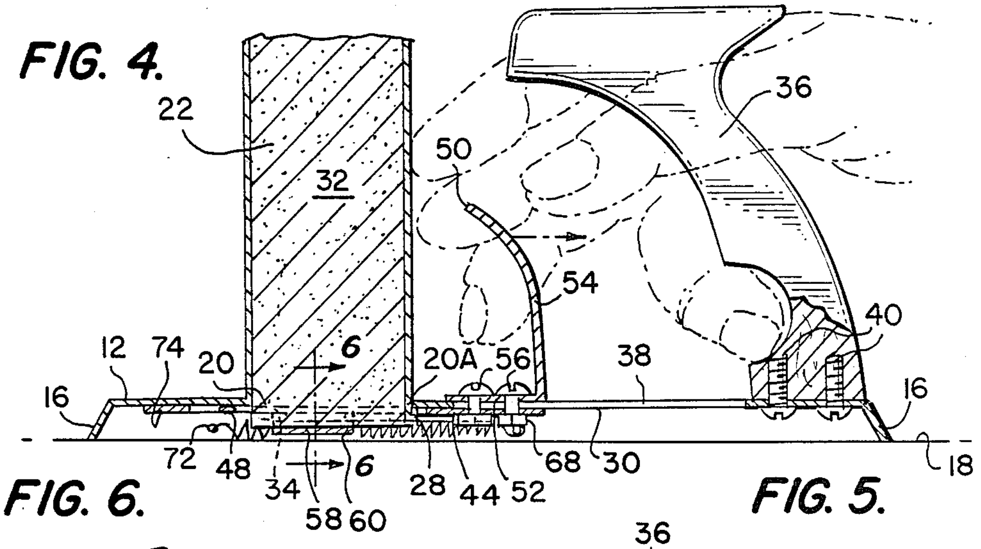
FIG. 4 is a partial side sectional view of the slicing and storing device taken through line 4—4 of FIG. 2 and depicting the trigger member being grasped by the hand of a user shown in phantom.

With reference to the drawings and, in particular, to FIGS. 1-3, the preferred embodiment for the slicing and storing device is indicated generally at 10. As shown therein, the slicing and storing device comprises a generally rectangular planar base 12 which is supported horizontally by a pair of integral side walls 14, 14' and a pair of end walls 16. As depicted in FIG. 4, side walls 14, 14' and end walls 16 support the base 12 such that, when the edges of the side and end walls rest upon a support surface 18, the base 12 is raised in relation to the support surface by a distance generally corresponding to the height of the side walls.

As can best be seen in FIGS. 2, 3 and 4, the base 12 is provided with a generally square opening 20 from which extends upwardly, perpendicular to the base, a tubular member 22 of square cross-sectional configuration. The tubular member terminates in outwardly flared edges 24 which define an opening 26. A stop member 28 in the form of a depending flange extends downwardly from the bottom surface 30 of the base 12. The stop member projects downwardly from the base proximate to an interior edge 20A of the opening 20 and generally parallel to or along the edge 20A.

Figure 6:
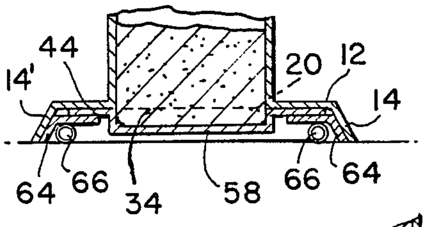
FIG. 6 is a partial sectional view of the slicing and storing device taken along line 6—6 of FIG. 4.
Figure 5:
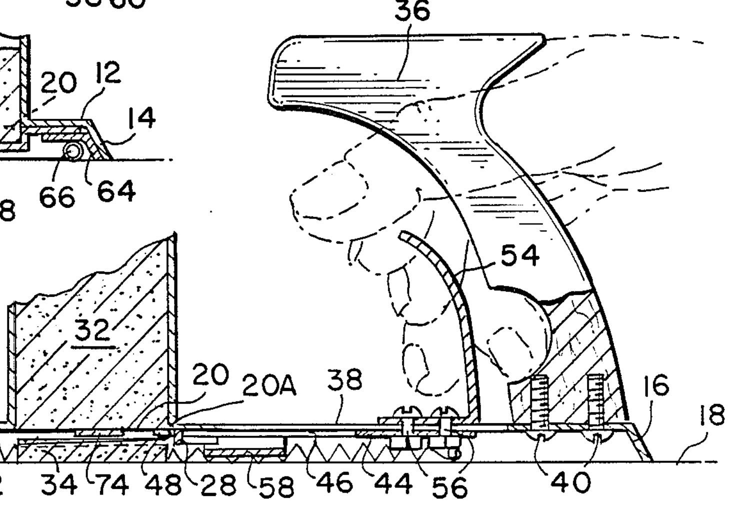
FIG. 5 is partial side sectional view of the slicing and storing device depicting the trigger member being actuated by the hand of the user shown in phantom.

The tubular member 22 projects upwardly from the base to a height which allows it to receive, enclose and protect a vertically oriented ¼ pound size bar or stick of butter 32, margarine or the like, as shown in FIG. 1. Flared edges 24 of the tubular member protect the butter bar from damage as it is manually inserted by a user into the opening 26 of the tubular member. It should be noted that opening 20 and tubular member 22 may be formed so as to conform to any one of a number of configurations, depending upon the configuration of the product to be contained therein. Additionally, it is within contemplation of the subject invention that the tubular member be formed integral with the base member, or formed as a separate element which is subsequently assembled to the base. As depicted in FIGS. 4-6, when the bar or block of butter 32 is received within the tubular member, gravitational forces upon the butter bar cause the butter bar to descend, such that a portion 34 of the bar extends through the opening 20 in the base and projects for a distance beneath the bottom surface 30 of the base.

An upwardly curved handle member 36 is provided on the top surface 38 of the base, being located on the base generally opposite to the tubular member 22. A pair of screws 40 extend through the base 12 from the bottom surface 30 and into the handle member for purposes of positively securing the handle member to the base as illustrated in FIGS. 4 and 5. The screws, of course, may be replaced by any other suitable fastening means for securing the handle member to the base.

An elongated slot 42 is provided in the base 12, located generally between the handle member and the tubular member. A slice holder plate 44, best depicted in FIGS. 3-6, is provided adjacent the bottom surface 30 of the base underlying the opening 20 and at least that portion of the slot 42 which is proximate to the opening 20. A slice holder slot 46 is provided in the slice holder plate such that the slot 46 normally underlies and is aligned with the opening 20 in the base 12. Stop member 28 is allowed to project beneath the slice holder plate through slice holder slot 46. Thus, as seen in FIGS. 4 and 5, the butter bar projects not only through the opening 20 in base 12, but also through the slice holder slot 46. The edge 46A of slot 46, said edge being located directly opposite the stop member and generally parallel thereto, is in the form of a slicer or cutting member 48.

The slice holder plate 44 is adapted to cooperate with a trigger member 50 provided on the top surface 38 of the base 12. The trigger member 50 is defined by a trigger base 52 and an upwardly curved grasping portion 54. With reference to FIGS. 4 and 5, it can be seen that the trigger base is located on the top surface 38 of the base to overlie a portion of the elongated slot 42 at the end of the slot opposite the handle member and in general alignment with the handle member. The slice holder plate 44 is located to underlie the bottom surface 30 of the base, with a portion of the slice holder plate underlying that portion of slot 42 which is covered by the trigger base. The trigger base 52 and the underlying portion of the slice holder plate 44 are operatively connected by means of rivets 56 which extend through the trigger base 52, the slot 42 and the slice holder plate 44 to secure the trigger base and slice holder plate together. Obviously, rivets 56 may be replaced by other suitable fastening means.

With particular reference to FIGS. 2, 3 and 4, the slice holder plate 44 is provided with a food support member 58 including a recessed support base 60 which extends transversely across the slice holder slot 46 between side walls 14, 14' of the base. The food support member thus provides a surface for holding and supporting the projecting portion of the butter bar which extends through opening 20 in the base and through slice holder slot 46. The food support base member, because it is recessed, supports the butter bar so that a specified, predetermined portion of the bar projects beneath the slice holder plate 44. It is to be noted further that the recessed food support may, alternatively, be formed separate from the slice holder plate, being subsequently secured thereto.

An angular flange 64 is secured to each of the side walls 14, 14' of the base and underlies, but is not secured to, the edge of the slice holder plate 44 which runs parallel to the respective side wall, as is illustrated in FIGS. 3 and 6. Because the slice holder plate is not secured to the base or to the angular flanges, it is capable of sliding motion with respect to the base. A spring member 66 is attached to a first end 68 of the slice holder plate and extends generally proximate to an opposite second end 70 of the plate, at which point the spring 66 is attached to the base 12 and, as depicted here, to a side wall 14 of the base at 72.

Operation of the slicing and storing device is best described in conjunction with FIGS. 4 and 5. It can be seen that, in the normal position of the device shown in FIG. 4, the slice holder plate is maintained by the generally untensioned springs in a position wherein the slice holder slot normally underlies and is in alignment with the opening in the base through which a butter or other food bar, which has been inserted into the tubular member, descends under the influence of gravity. Descension of the food bar thus results in a portion of the bar being projected through the opening in the base and through the slice holder slot whence it comes to rest upon the recessed food support member. Therefore, a portion of the butter bar extends beneath the slice holder plate, with the vertical distance between the food support base and the cutting member being essentially equal to the thickness of the butter slice which is produced with the device.

As can be further seen in FIG. 4, the stop member is located along one side of the projecting butter portion, and the cutting member is disposed along the opposite side of the stationary, projecting portion of butter.

The slicing and storing device is adapted to produce a butter slice of the specified thickness when a user operates the device by manually grasping the handle member and trigger member and pulling the trigger member toward the handle as shown in FIG. 5. The trigger member is adapted to slide toward the handle member on the top surface of the base and along the length of the elongated slot by virtue of its connection with the slice holder plate which, as previously noted, is capable of sliding movement with respect to the bottom surface of the base along the angular flanges. When the trigger member is brought toward the handle member, the rivets which secure the trigger member to the slice holder plate slide within and along the elongated slot in the base. When the trigger member is manually brought toward the handle member, the spring members are caused to stretch and are placed under tension, as shown in FIG. 5.

As the trigger member and, hence, the slice holder plate, are drawn toward the handle, the cutting member is drawn through the projecting portion of the butter bar. The cutting member cleanly slices off the projecting portion of butter, slicing through the projecting portion until it contacts the stop member. The sliding motion of the slice holder plate is thus restricted by the cutting member being prevented from further motion by its contact with the stop member. The stop member serves the further purpose of preventing the butter slice from being drawn back into the device. When the cutting member has reached the stop member, it will have completely sliced through the projecting portion of the butter bar, and the food support member, because it moves toward the handle along with the slice holder plate, will no longer underlie the butter bar. The slice which has been produced by action of the cutter member is therefore unsupported and free to fall by gravity away from the slicing and storing device. A solid portion 74 of the slice holder plate is then positioned to underlie the opening 20 in the base so as to prevent the butter bar from descending through the opening until the slice holder plate has returned to its normal position wherein the food support member underlies the opening.

The trigger member and slice holder plate are adapted to automatically be returned to the normal position under the restoring force of the spring when the user releases the manual pressure which has been applied to the trigger member in drawing it toward the handle. Once the slice holder plate has assumed its normal position, the opening in the base is again in alignment with the slice holder slot, such that an identical portion of the butter bar is allowed to project through the aligned opening and slot and be supported by the support member. The trigger member may then be subsequently utilized as discussed above to produce a butter slice of the uniform specified thickness.

It is apparent that the subject device is capable of depositing the butter slices produced therewith directly into an eating or serving receptacle, without the need for contact with the hands of the user. The device possesses the additional advantage of being made operable by means of a single hand in a simple and effortless manner. Furthermore, the device is capable of protecting and storing the food contained therein merely by resting the side walls of the base upon a support surface in a refrigerator or otherwise. Finally, the slicing and storing device is characterized by structural integrity due to its few, easily maintainable parts, and is easily cleanable for a long life of successful use.

While the instant invention has been described with a degree of particularity in connection with a preferred embodiment, it should be understood that the foregoing disclosure is made by way of example and that many variations and modifications of the details of construction and combination and arrangement of parts herein may be adapted without departing from the spirit and scope of the invention as defined in the appended claims.

What is claimed is:

1. A slicing and storing device comprising a base, an opening formed in said base, a tubular member extending upwardly from said opening, said tubular member being adapted to receive a food product to be sliced, a handle member secured to said base, a trigger member provided on said base generally between said handle member and said tubular member, said trigger member being adapted to be grasped by a user and manually drawn toward said handle member, a slice holder plate operatively connected to said trigger member for movement therewith when said trigger member is drawn toward said handle member, a slot formed in said slice holder plate, said slot being adapted to be generally aligned with said opening in said base when said slicing and storing device is in a normal position, a recessed support surface extending across said slot in said slice holder plate, said food product being adapted to descend within said tubular member such that a portion of said food product projects through said aligned opening and said slot and is supported on said support surface, a stop member provided on said base and projecting downwardly through said slot in said slice holder plate, a cutting member located generally opposite said stop member along an edge of said slot, spring means extending between said slice holder plate and said base, said slice holder plate being adapted for sliding movement with respect to said base when said trigger member is manually drawn toward said handle member such that said cutting member is drawn through said projecting portion of food until said cutting member contacts said stop member so as to produce a slice of said food of uniform thickness, said spring means is placed under tension, said food support surface is moved out of alignment with said opening such that said slice is free to fall away from said device, and an unslotted portion of said slice holder plate underlies said opening so as to prevent said food product from descending within said tubular member, said slice holder plate being adapted to automatically return to said normal position under the restoring force of said spring means when said trigger member is released.

2. The slicing and storing device recited in claim 1 wherein said base is provided with an elongated slot, said elongated slot extending generally between said handle member and said tubular member, said trigger member being connected to said slice holder plate through said elongated slot.

3. The slicing and storing device recited in claim 1 wherein said base is provided with first and second side walls and a pair of end walls, an angular flange is secured to each of said side walls and extends beneath, but is not secure to, said slice holder plate, said slice holder plate being adapted for sliding movement between said base and said flanges when said trigger member is manually down toward said handle member.

4. The slicing and storing device recited in claim 2 wherein said spring means comprises a first coil spring which is secured at its first end to said slice holder plate and at its second end to said first side wall, and a second coil spring which is secured at its first end to said slice holder plate and at its second end to said second side wall.

5. A slicing and storing device comprising a base, said base being supported by first and second side walls and a pair of end walls, said side walls and said end walls being adapted to support said base in raised relation to a support surface, an opening provided in said base, a tubular member extending upwardly from said opening, said tubular member being adapted to receive a food product to be sliced, a handle member secured to said base, a slot provided in said base extending generally between said handle member and said tubular member, a trigger member provided on said base overlying a portion of said slot opposite said handle member, a slice holder plate underlying said base member, connecting means for operatively securing together said slice holder plate and said trigger member through said slot, said trigger member being adapted to be grasped by a user and manually drawn toward said handle member along said slot, a slice holder slot formed in said slice holder plate, said slice holder slot being adapted to be generally aligned with said opening in said base when said slicing and storing device is in a normal position, a recessed food support surface extending across said slice holder slot, said food product being adapted to descend within said tubular member such that a portion of said food product projects through said aligned opening and slice holder slot and is supported on said food support surface, a stop member provided on said base and projecting downwardly through said slice holder slot, a cutting member located along an edge of said slice holder slot generally opposite and parallel to said stop member, a first angular flange secured to said first side wall and extending beneath, but not being secured to, said slice holder plate, a second angular flange secured to said second side wall and extending beneath, but not being secured to, said slice holder plate, first spring means secured at a first end to said slice holder plate proximate said connecting means and at a second end to said first side wall proximate said cutting member, second spring means secured at a first end to said slice holder plate proximate said connecting means and at a second end to said second side wall proximate said cutting member, said slice holder plate being adapted for sliding movement with respect to said base between said base and said angular flanges when said trigger member is manually drawn toward said handle member such that said cutting member is drawn through said projecting portion of food until said cutting member contacts said stop member so as to produce a slice of said food of uniform thickness, said first and second springs are placed under tension, said food support surface is moved out of alignment with said opening such that said slice is free to fall away from said device, and an unslotted portion of said slice holder plate is brought into a position wherein it underlies said opening so as to prevent said food product from descending within said tubular member, said slice holder plate being adapted to automatically return to said normal position under the restoring force of said springs when said trigger member is released.

6. The slicing and storing device recited in claim 5 wherein said tubular member and said opening are similarly shaped so as to be adapted to receive a food product in bar form.

7. The slicing and storing device recited in claim 5 wherein said tubular member is provided with an open end for insertion of said food product.

8. The slicing and storing device recited in claim 5 wherein said tubular member may be formed integral with said base.

9. The slicing and storing device recited in claim 5 wherein said tubular member may be formed separate from said base and subsequently assembled thereto.

10. The slicing and storing device recited in claim 5 wherein said slot in said base is elongated.

11. The method of using a slicing and storing device characterized by a tubular member which extends upwardly from a base and communicates with an opening in said base, said tubular member having an opening, a handle member provided on said base, a trigger member provided on said base, said trigger mechanism being adapted to be manually drawn toward said handle member, a slice holder plate underlying said base and being operatively connected to said trigger member, a slice holder slot provided in said slice holder plate and normally being generally aligned with said opening in said base, a stop member projecting downwardly through said slice holder slot, a cutting member provided on said slice holder plate opposite said stop member, a food support member extending across said slice holder slot, and spring means secured between said slice holder plate and said base, said slice holder plate being adapted for movement with respect to said base when said trigger member is manually drawn toward said handle member, said method comprising the steps of:

manually inserting a food product into said opening in said tubular member such that said food product descends within said tubular member and a portion of said food product projects through said aligned opening and said slice holder slot and is supported on said food support member;

manually grasping said handle member and said trigger member;

manually locating said slicing and storing device above the surface which is to receive a slice of said food product;

manually drawing said trigger member toward said handle member such that said slice holder plate is also drawn toward said handle member whereby said cutting member is drawn through said projecting portion of food product until it contacts said stop member so as to produce a slice of food product, said food support member is moved out of alignment with said opening in said base so that said slice may fall away from said device onto said surface, said spring means is placed under tension, and an unslotted portion of said slice holder plate is moved into a position wherein it underlies said opening in said base so as to prevent further descension of said food product; and manually releasing said trigger member whereby said trigger member and said slice holder plate automatically return, under the restoring force of said spring means to said position wherein said slice holder slot is generally aligned with said opening in said base, said food product is allowed to project through said aligned opening and slot and is supported by said food support member.

* * * * *